March 26, 1968     R. E. JOYCE ET AL     3,374,987
ADHESIVE MIXER-APPLICATOR FOR USE WITH FAST CURING ADHESIVES
Filed April 17, 1967     2 Sheets-Sheet 1

INVENTORS
RUDY E. JOYCE
EARL D. HASENWINKLE
FRANK WISLOCKER
BY
ATTORNEYS

March 26, 1968 R. E. JOYCE ET AL 3,374,987
ADHESIVE MIXER-APPLICATOR FOR USE WITH FAST CURING ADHESIVES
Filed April 17, 1967 2 Sheets-Sheet 2
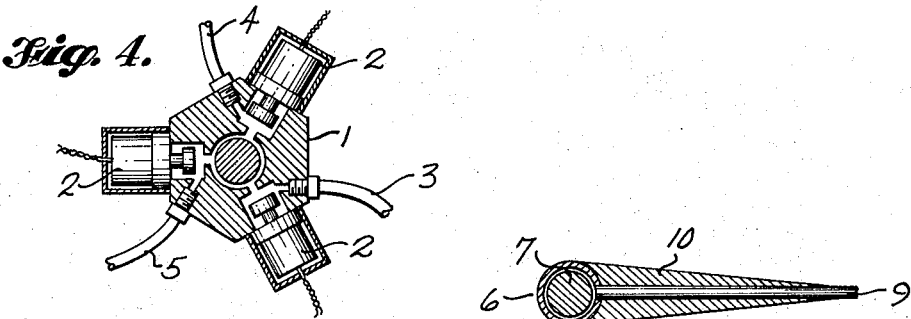
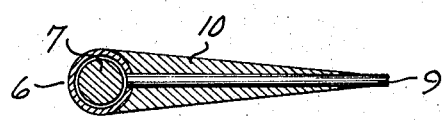
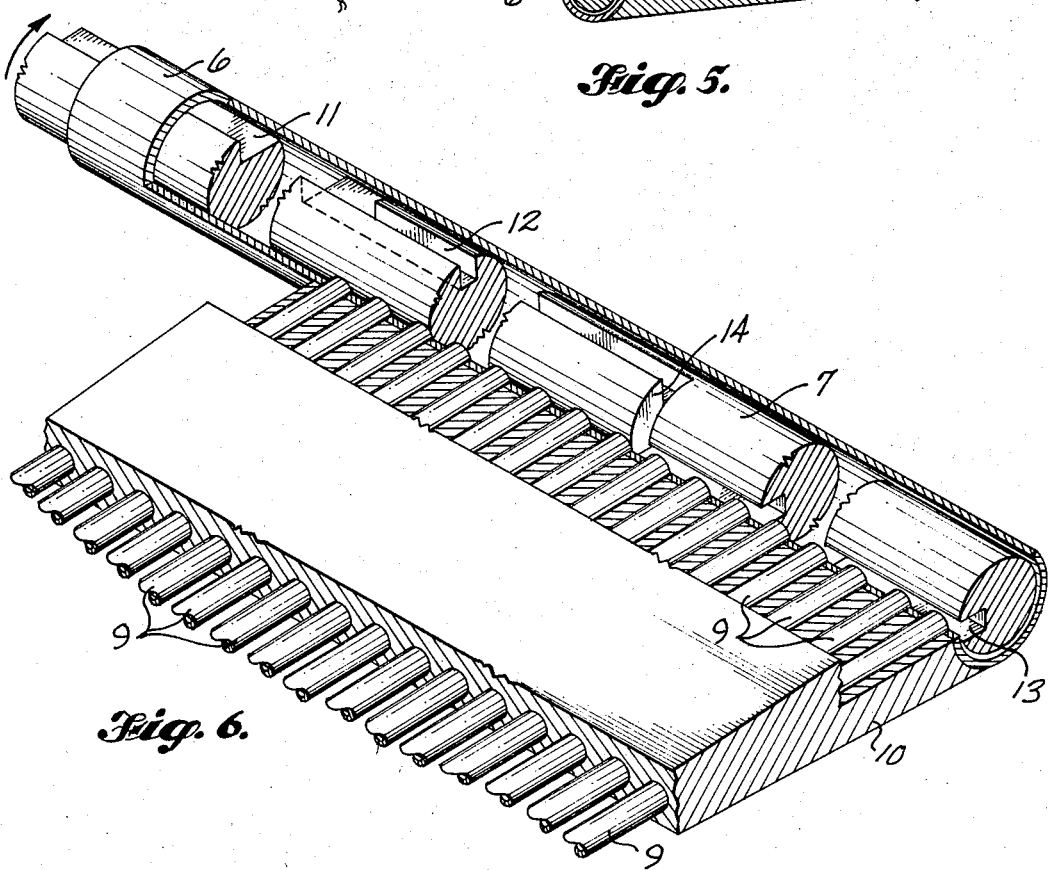
INVENTORS
RUDY E. JOYCE
EARL D. HASENWINKLE
FRANK WISLOCKER
BY
ATTORNEYS

United States Patent Office 3,374,987
Patented Mar. 26, 1968

3,374,987
ADHESIVE MIXER-APPLICATOR FOR USE
WITH FAST CURING ADHESIVES
Rudy E. Joyce, Earl D. Hasenwinkle, and Frank Wislocker, Longview, Wash., assignors to Weyerhaeuser Company, Tacoma, Wash., a corporation of Washington
Filed Apr. 17, 1967, Ser. No. 631,397
8 Claims. (Cl. 259—7)

ABSTRACT OF THE DISCLOSURE

An adhesive mixer-applicator adapted to operate in a highly restricted space for substantially simultaneously mixing the components of fast curing adhesives and applying them to a moving surface. The apparatus is composed of a manifold having a series of distribution tubes connected at right angles to the manifold for delivery of adhesive to the moving surface to be bonded, means connected to the manifold for separately admitting adhesive components to the manifold, and a rotatable shaft mounted within the manifold. The shaft is sized such that the adhesive passing between the clearance of the shaft and the inner wall of the manifold is subjected to high shear sufficient to cause turbulent mixing of the adhesive.

Background of the invention

As automation and more elaborate machinery are steadily being employed in the lumber industry and particularly in the production of laminated products to both speed production and efficiency, it has been necessary to devise means of using fast curing adhesive systems in conjunction with production machinery where the material to be bonded is moving at a fast rate of speed. Numerous problems have been encountered in attempting to device an adhesive applicator using adhesives having fast curing times. Adhesives of this type must be spread on the material to be bonded almost immediately after mixing of the components in order to eliminate adhesive precure. In continuous operations, this requires that the applicator be as close to the pressing operation as possible, i.e., near the nip of the press. Mixed adhesives having short curing times cannot be pumped any appreciable distance because curing takes place almost instantaneously, such curing resulting in plugging of the system. In addition, most fast curing adhesives undergo an exothermic reaction which effectively precludes mixing the adhesive components together in large volume. Ideally, the adhesive should be mixed at the rate of application with zero dwell time in the mixer-applicator.

There are many adhesive applicators known for applying adhesives to wood laminae, however, none have been found which are effective for the purpose desired. In most of the known mixer-applicators, the mixing chambers are too large, permitting an exothermic reaction to take place at low flow rates and requiring that the mixed adhesive be pumped a considerable distance into the small confines of the applicator. In addition, most prior art devices require external mixing of the adhesive separate from the applicator. With fast curing systems, this causes build up of cured adhesive on the inside walls of the distribution tubes affecting the uniformity of flow of adhesive onto the material to be bonded.

Summary

This mixer-applicator of this invention allows handling of materials to be bonded where fast press times and fast curing adhesives are desired. Particularly, this apparatus is useful in the bonding of boards and wood veneer to form laminated wood products at fast rates of speed. By keeping the volume of the mixed adhesives small and the dwell time in the mixer-applicator short, adhesives having a "pot life" of only a few seconds can be easily employed. The apparatus of this invention is also small enough to be located immediately adjacent the required point of application, thus eliminating the need for pumping the mixed adhesive a considerable distance.

Brief description of the drawings

FIGURE 4 is a sectional view along line 4—4 of the valved inlets provided for metering adhesive components and a solvent for flushing the system into the mixing chamber and distribution tubes.

FIGURE 5 is a cross-sectional view along line 5—5 of the distribution tubes for applying the adhesive to the surface of material to be bonded.

FIGURE 6 is a perspective view of a preferred form of the mixing rotor.

Detailed description of the drawings

Figure 1:
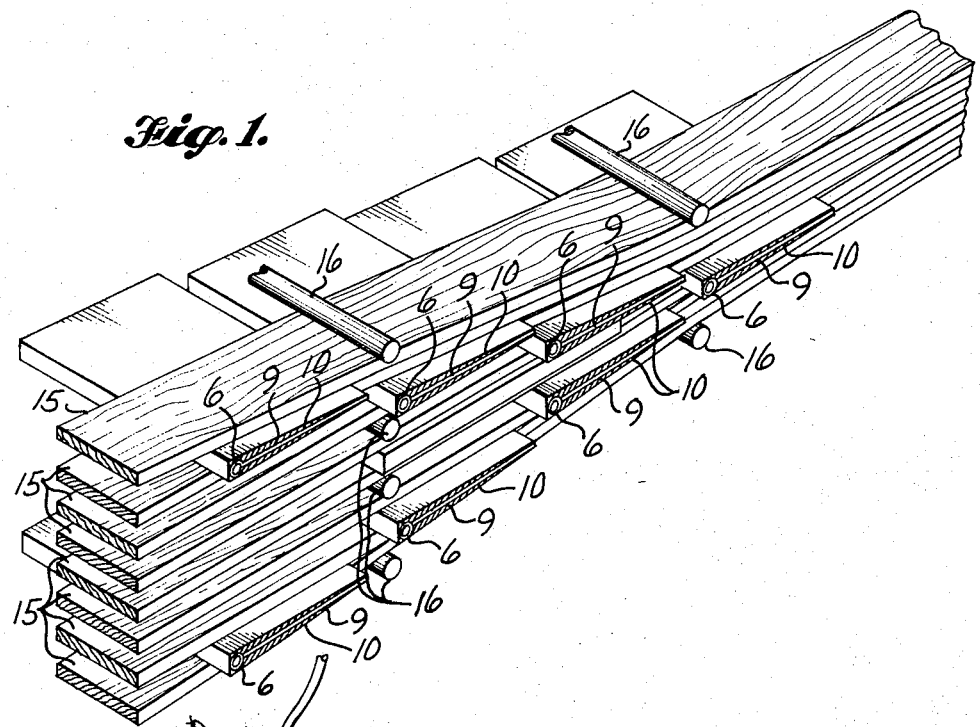
FIGURE 1 is a side elevation showing the position of several mixer-applicators as used in conjunction with the manufacture of laminated wood products.
Figure 2:
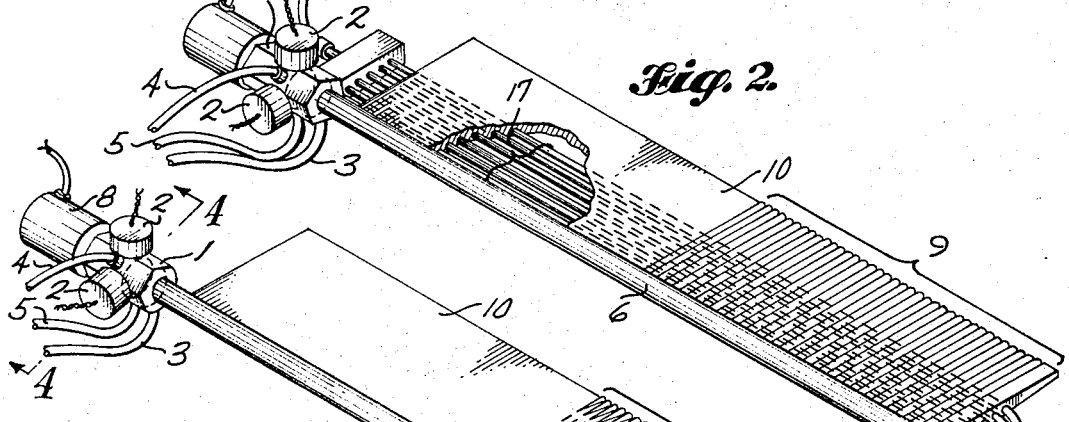
FIGURE 2 is a perspective view of the mixer-applicator including cooling tubes.
Figure 3:
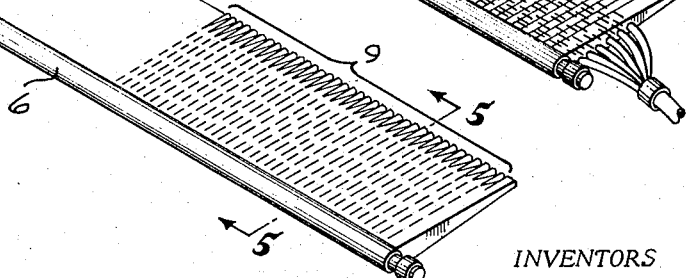
FIGURE 3 is a perspective view of the mixer-applicator without cooling tubes.

Referring now to the drawings in more detail, and in particular to FIGURES 2 to 5, 1 represents a valve body containing adjustable valves 2 and inlets 3, 4, and 5 for admitting the adhesive components and a material such as a solvent, water, air, or steam, when such is desired to clean the apparatus. Normally a resin component is admitted through one inlet and a corresponding hardener through a separate inlet to form a two-component adhesive. However, as many inlets may be provided as desired for use of three, four or more components of an adhesive mixture. To the valve body is attached manifold tube 6 within which is mounted rotor 7. The rotor 7 is operatively connected through suitable bearings and linkage with motor 8 as shown. Distribution tubes 9 are attached at right angles to the manifold tube, these tubes serving to distribute the adhesive over the width of the material to be bonded. As many distribution tubes may be provided as necessary to cover adequately the surface of the material to be bonded. A casting 10 may be placed around the distribution tubes as shown in FIGURE 5 to form a foil suitable for insertion immediately adjacent the point where moving laminae 15 (such as shown in FIGURE 1) are brought together by guides 16. A portion of the foil is shown in FIGURES 2 and 3 as not having any distribution tubes. This extra portion of the foil is designed for easy extraction and insertion of the distribution portion of the foil into operating position. Cooling tubes 17 may be provided above or below the distribution tubes 9 to more accurately control the temperature of the adhesive mixture, as shown by FIGURE 2.

It is of critical importance that the adhesive components be adequately mixed before being spread on the material to be bonded. To accomplish this, the clearance between the shaft and the inner wall of the manifold must be such that the adhesive components passing between the walls is subjected to a shear force sufficient to cause turbulence adequate for mixing the adhesive. In order to insure uniform flow across the distribution tubes when using a smooth circular rotor 3, it is desirable that the annular area between the rotor 7 and the manifold tube 6 be greater than the total inside area of all distribution tubes 9. For example, with a rotor diameter of 0.376 inch and a corresponding manifold internal diameter of 0.5 inch, distribution tubes having an inside diameter of 0.058 inch are particularly useful when operating at pressures ranging from about 300 p.s.i.g. up to 600 p.s.i.g. Of course the particular diameter and length of the distribution tubes needed for uniform flow in conjunction with a rotor and manifold of a particular size can be determined for the particular application by one skilled in the art. A preferred embodiment of the rotor 7 is shown in FIGURE 6. Referring now to FIGURE 6, reference numeral 11 designates a grooved area designed to permit the adhesive to fold back on itself. This improves mixing over that of the simple high shear mixing provided by a smooth shaft rotor. Longitudinal groove 12 adjacent to and communicating with the mixing groove 11 is connected to a second longitudinal groove of smaller area 13 by radial groove 14. The two longitudinal grooves are so designed that only a certain predetermined number of the distribution tubes are open to the manifold at a particular time. Use of this particular design rotor provides more uniform distribution of the adhesive across the distribution tubes than the smooth shaft rotor. As the mixed adhesive moves from the mixing end across the distribution tubes, the temperature rises due to energy supplied by the moving rotor and the exothermic reaction of the adhesive. The result is lowered viscosity and higher flow on the end opposite the mixer. The shapes of the longitudinal grooves and the connecting radial groove can be designed with a decreasing area which, along with the resistance to flow provided by the rotating radial grooves, compensates for viscosity change and results in more uniform flow across the distribution tubes. Of course, when using a greater number of distribution tubes, more longitudinal grooves of varying area connected by suitable radial grooves can be provided. In addition to providing uniform distribution across the distribution tubes, this particular design rotor provides a pulsating action through the distribution tubes. As the rotor turns, the longitudinal grooves open to only a specific number of distribution tubes at any one time, resulting in a pulsating action. This keeps flow velocity relatively high in the open tubes and results in a flushing action which virtually eliminates any tube plugging due to pre-curing of the adhesive.

Referring now to the method of operation of the particular apparatus described, adhesive components are metered into the mixing chamber through inlets 3 and 4 and valves 2. The ratio of the components and the total component flow can be accurately controlled and related to the line speed past distribution tubes 9 to yield an accurate spread weight on the material to be bonded. The metered components flow between rotor 7 and manifold 6 and eventually out the distribution tubes 9. High shear mixing is accomplished by the rotating rotor 7 inside the stationary manifold tube 6. When the mixer applicator is not in use, cleaning is accomplished by shutting the valves controlling entry of the resin components into the mixing chamber, stopping the metering pumps, opening flushing valve 2 and flushing the entire system with a suitable solvent through inlet 5.

Adhesives which can be used with the apparatus described include any of the conventional adhesives such as phenol-formaldehyde, urea-formaldehyde, resorcinol-formaldehyde, mixtures of the foregoing, epoxy resins and many others. Using a phenolic-resorcinol-formaldehyde resin, for example, and operating at minimum pressure, viscosities of from 200 to 5,000 centipoises have been used, although it is possible to lower viscosities to the desired level by preheating the components.

Although this apparatus has its widest use in conjunction with the production of laminated wood products, it can be used in a number of other ways where fast press times using fast curing adhesive systems are necessary.

What is claimed is:

1. An apparatus for mixing a fast curing adhesive and applying it within a short period of time to the surface of a material to be bonded with a second material to form a laminated product which comprises:
    (a) a body having valves for admitting fluid into the interior of the body,
    (b) an elongated manifold closed at one end and in communication with the valve body at the other end,
    (c) a plurality of distribution tubes in communication with and extending at substantially right angles to the manifold for delivery of the mixed adhesive from the manifold to the surface of the material to be bonded, the tubes all being in a common plane,
    (d) a rotatable shaft mounted within the manifold, the shaft of a size with respect to the size of the manifold that the adhesive composition passing between the shaft and the inner wall of the manifold is subjected to shear sufficient to cause turbulence for mixing of the adhesive, and
    (e) power means operatively connected to the shaft for rotation thereof.

2. Apparatus according to claim 1 in which the shaft is grooved to improve mixing.

3. Apparatus according to claim 1 wherein the area between the shaft and the inner wall of the manifold is greater than the total internal area of all the distribution tubes so that uniform distribution of the adhesive across the tubes is provided.

4. Apparatus according to claim 1 wherein the shaft has a number of interconnected longitudinal grooves each open only to a predetermined number of tubular distribution tubes at any one time so as to provide uniform flow and pulsating action across the open distribution tubes.

5. Apparatus according to claim 4 wherein the shaft comprises:
    (a) a member of circular cross section having a first longitudinal groove of a predetermined area cut parallel to the axis of the shaft a length equaling that of a first group of distribution tubes,
    (b) additional longitudinal grooves of an area larger than the first longitudinal groove cut parallel to the axis of the shaft, each additional groove displaced by a radial angle so as to be in non-aligned relationship with adjacent grooves and of a length determined by remaining groups of distribution tubes,
    (c) radial grooves connecting the longitudinal grooves, the radial grooves being essentially tangential and substantially defining a sector of an annulus, and
    (d) a mixing groove in communication with the longitudinal grooves cut in the portion of the shaft nearest the valve body and designed to improve mixing of the adhesive.

6. Apparatus according to claim 1 wherein the distribution tubes are of a size and shape necessary to fit between two laminae as they enter the nip of a press.

7. Apparatus according to claim 6 wherein a formed member is placed around the distribution tubes to form a wedge-shaped foil.

8. Apparatus according to claim 7 including cooling tubes which pass through the formed member and adjacent the distribution tubes to control the viscosity and cure rate of the adhesive.

References Cited

UNITED STATES PATENTS

| | | | |
|---|---|---|---|
| 2,102,125 | 12/1937 | Mink | 259—5 |
| 3,067,987 | 12/1962 | Ballou et al. | 259—7 |
| 3,338,561 | 8/1967 | Schweer | 259—7 X |

ROBERT W. JENKINS, *Primary Examiner.*